United States Patent [19]

Haikawa et al.

[11] Patent Number: 5,173,813
[45] Date of Patent: Dec. 22, 1992

[54] IMAGE PROCESSING METHOD AND APPARATUS

[75] Inventors: Yukihiko Haikawa; Yukiharu Hosono, both of Higashi-Hiroshima, Japan

[73] Assignee: Sharp Kabushiki Kaisha, Osaka, Japan

[21] Appl. No.: 893,561

[22] Filed: Jun. 3, 1992

Related U.S. Application Data

[63] Continuation of Ser. No. 446,988, Dec. 6, 1989, abandoned.

[30] Foreign Application Priority Data

Dec. 6, 1988 [JP] Japan .................. 63-308412

[51] Int. Cl.⁵ .................. G11B 27/02; H04N 5/78
[52] U.S. Cl. .................. 360/14.1; 360/33.1
[58] Field of Search .............. 358/906, 909, 182, 181, 358/311; 360/14.1, 14.2, 14.3

[56] References Cited

U.S. PATENT DOCUMENTS 4,325,088 4/1982 Wright .................. 360/14.1
4,355,332 10/1982 Beeson .................. 358/182
4,360,831 11/1982 Kellar .................. 358/182
4,922,845 5/1990 Barton et al. .................. 358/182

FOREIGN PATENT DOCUMENTS 60-98780 6/1985 Japan .

Primary Examiner—Andrew L. Sniezek
Assistant Examiner—Varsha V. Sheladia
Attorney, Agent, or Firm—Robert F. O'Connell; Dike, Bronstein, Roberts & Cushman

[57] ABSTRACT

A method and apparatus for processing image signals read out from a recording medium in which different kinds of image signals are stored. One frame of the image signals from the recording medium is stored in sequence until a time at which the kind of image signals is switched. The stored image signals are read out and the level thereof are gradually decreased from the switched time, and simultaneously the level of the image signals read out from the recording medium subsequent to the stored image signals are gradually increased. Then, the level of the decreased image signals are added with the level of the increased image signals.

11 Claims, 6 Drawing Sheets

Fig. I

IMAGE PROCESSING METHOD AND APPARATUS

This is a continuation of copending application Ser. No. 07/446,988 filed on Dec. 6, 1989 now abandoned.

BACKGROUND OF THE INVENTION

1. Field of the Invention

The present invention relates to a method and apparatus for processing image signals reproduced from a recording medium.

2. Description of the Related Art

In case that image signals are reproduced from a recording medium such as a magnetic tape, the image signals magnetically stored in the magnetic tape are successively read out, and then demodulated into video signals as they are. Therefore, if two kinds of image signals, e.g., from two different scenes of a video presentation, are successively stored in the recording medium, one kind of the image signals will be read out immediately after the other kind of the image signals causing a sudden change of the images being displayed. This sudden change is extremely unpleasant or annoying to viewers of the image display.

SUMMARY OF THE INVENTION

It is therefore an object of the present invention to provide a method and apparatus for processing image signals, whereby no unpleasant sudden changes in the display are presented when the reproduced image signals are switched from one kind to another different kind.

According to the present invention, the above object can be accomplished by a method of processing image signals read out from a recording medium in which different kinds of image signals are stored. The method comprises the steps of storing in sequence one frame of the image signals from the recording medium until a time at which the kind of the image signals is switched, gradually decreasing the level of the stored image signals from the switched time, gradually increasing the level of the image signals read out from the recording medium subsequent to the stored image signals from the switched time, and adding the level of the decreased image signals with the level of the increased image signals.

The above object can be also accomplished by an apparatus for processing image signals read out from a recording medium in which different kinds of image signals are stored. The apparatus comprises a storage for storing in sequence one frame of the image signals from the recording medium until a time at which the kind of the image signals is switched, a decreasing circuit for gradually decreasing the level of the image signals read out from the storage from the switched time, an increasing circuit for gradually increasing the level of the image signals read out from the recording medium subsequent to the stored image signals from the switched time, and an adder for adding the level of the decreased image signals with the level of the increased image signals.

Preferably, a timing signal indicating the switched time is preliminarily recorded in the recording medium, and the apparatus may further have a detection circuit for detecting the recorded timing signal.

It is preferred that the storage holds the stored one frame image signals for a predetermined period of time from the switched time.

The storage may be formed by an image memory capable of storing one frame of image signals.

The decreasing circuit may preferably include a multiplier for multiplying the image signals read out from the storage by a factor which is gradually decreased.

The multiplier may include a down-counter and a plurality of latches connected to the down-counter.

The increasing circuit may preferably include a multiplier for multiplying the image signals read out from the recording medium subsequent to the stored image signals by a factor which is gradually increased.

The multiplier may include an up-counter and a plurality of latches connected to the up-counter.

Further objects and advantages of the present invention will be apparent from the following description of the preferred embodiments of the present invention as illustrated in the accompanying drawings.

DESCRIPTION OF THE PREFERRED EMBODIMENTS

Figure 1:
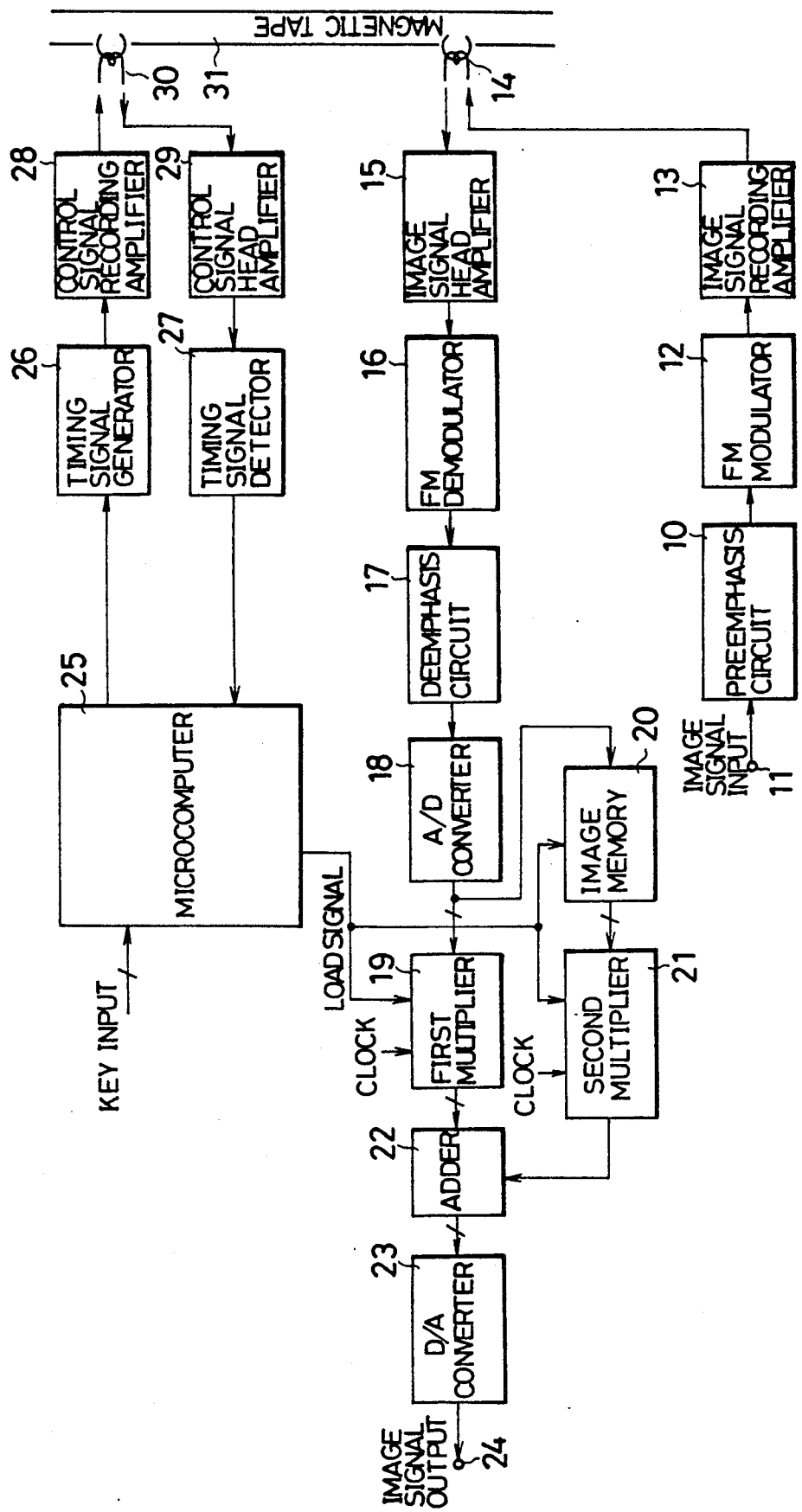
FIG. 1 is a block diagram showing an electrical arrangement of a video tape recorder according to an embodiment of the present invention.

FIG. 1 shows an electrical arrangement of a VTR (video tape recorder) as a preferred embodiment of an image processing apparatus according to the present invention.

In FIG. 1, reference numeral 10 designates a preemphasis circuit receiving an externally applied video signal (image signal) through an input terminal 11, and numeral 12 designates ah FM (frequency modulation) modulator coupled with the preemphasis circuit 10. The FM modulator 12 is connected at the output to a magnetic head 14 for read/write of image data signals, through an image signal recording amplifier 13.

The magnetic head 14 is coupled through an image signal head amplifier 15 to an FM demodulator 16. The demodulator 16 is connected at the output to an A/D (analog to digital) converter 18 via a deemphasis circuit 17. The output of the A/D converter 18 is connected to a first multiplier 19 and an image memory 20. The output of the image memory 20 is connected to a second multiplier 21. The outputs of the first and second multipliers 19 and 21 are coupled with an adder 22 whose output is connected to a D/A (digital to analog) converter 23. The output of the D/A converter 23 is connected to an output terminal 24, and an image data signal is outputted externally through the terminal 24.

The image memory 20, and the first and second multipliers 19 and 21 are coupled with a microcomputer 25. An image processing, which will subsequently be described, progresses in accordance with instructions from the microcomputer 25. The microcomputer 25 is further connected to an image switch timing signal generator 26 consisting of a monostable multivibrator, for example, and a detector 27 for detecting an image switch timing signal, consisting of a comparator, for example. The timing signal generator 26 and the timing signal detector 27 are coupled to a magnetic head 30, respectively, through a control signal recording amplifier 28 and a control signal head amplifier 29. The magnetic head 14 is for recording data into a video track of the magnetic tape 31, whereas the magnetic head 30 is for recording data into a control track of the tape 31.

The image signals externally applied through the input terminal 11 are preemphasized by the preemphasis circuit 10, and frequency modulated by the FM modulator 12. After being amplified by the recording amplifier 13, the modulated signals are recorded onto the video track of the tape 31 by means of the magnetic head 14.

Simultaneously with the recording of the image signals, control signals are recorded into the tape 31 by means of the magnetic head 30. In this instance, a timing signal for switching image signals is contained in the control signal. The timing signal represents a timing of switching different kinds of image signals from one kind to another kind. To record image signals which are of a different kind from that of the present image signals, onto the tape in successive order, an operator instructs the switching of the different kinds of image signals to the microcomputer 25 through a key operation. In response to the instruction, the microcomputer 25 operates the signal generator 26 so that a timing signal representing a time for switching the image signals is recorded as a part of the control signals onto the control track of the tape 31.

The control signal stored in the control track of the tape 31 is read out by the magnetic head 30, and applied to the detector 27 by way of the head amplifier 29. The result is to detect the image switch timing signal and to produce a digital signal in TTL level. When receiving the timing signal from the detector 27, the microcomputer 25 applies a load signal (FIG. 2) to the image memory 20, and the first and the second multipliers 19 and 21.

The image signals are read out from the tape 31 by the magnetic head 14, demodulated by the FM demodulator 16, and deemphasized by the deemphasis circuit 17. The analog image signals deemphasized are converted into digital signals by the A/D converter 18, and then applied to the first multiplier 19 and the image memory 20.

The image memory 20 is a frame memory with a memory capacity capable of storing one frame of image signals. Unless the timing signal is detected and thus the load signal is set to logical level of "1", the memory 20 always stores the latest image signals of one frame. When the timing signal is detected and the load signal is set to logical level of "1", the memory 20 retains the image signals stored before the timing signal is detected, during a period that the load signal is maintained in the logical level of "1". Also during this period, the image signals are read out from the image memory 20, and applied to the second multiplier 21.

Figure 2:
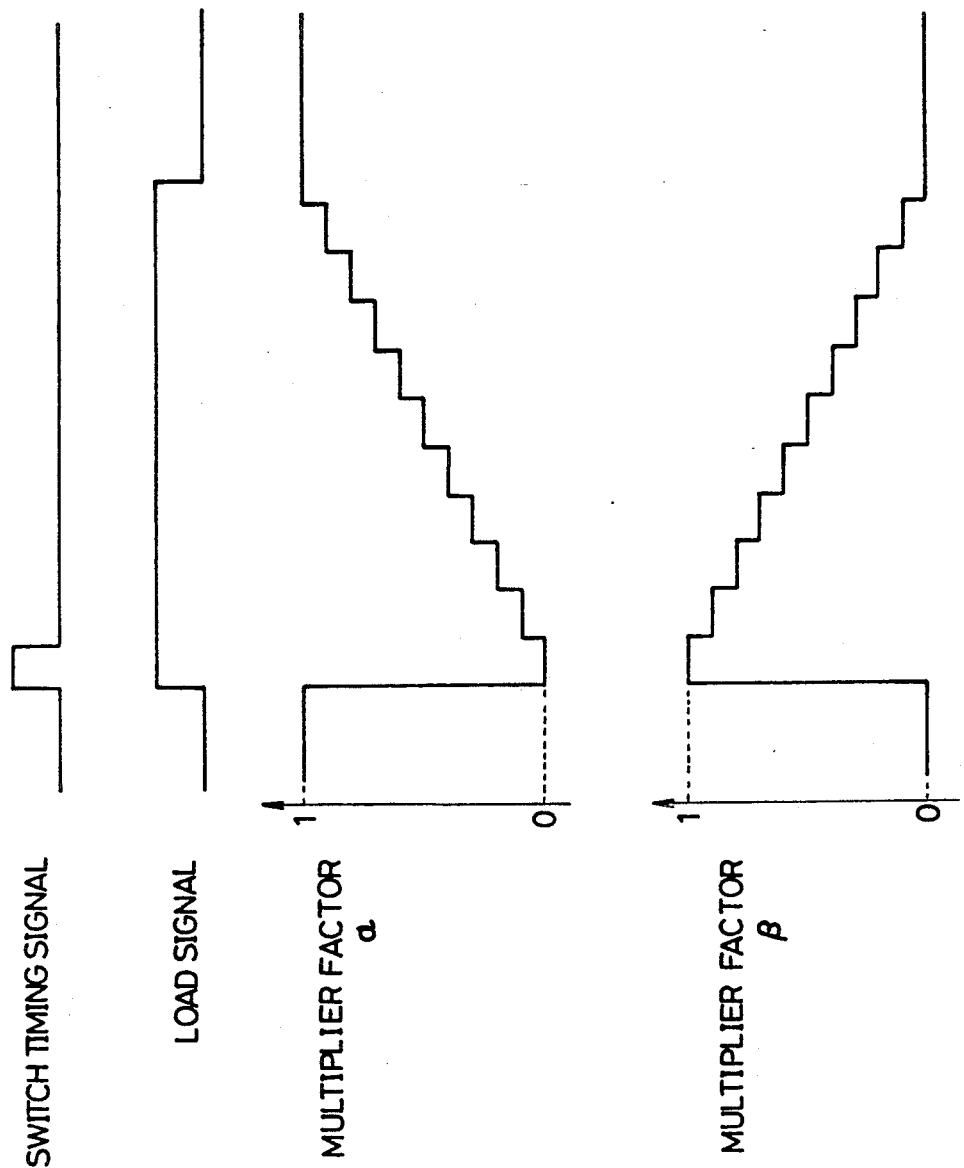
FIG. 2 shows a set of waveforms of signals in the video tape recorder of FIG. 1.

The first multiplier 19 multiplies the value of the image signals derived from the A/D converter 18 by a multiplier factor $\alpha$ shown in FIG. 2. As shown, the factor $\alpha$ is kept in "1" till the timing signal is detected and the load signal is set to logical level of "1". At an instant that the timing signal is detected, the factor $\alpha$ falls to "0" and then gradually increases from "0" to "1".

The second multiplier 21 multiplies the value of the image signals derived from the image memory 20 by a multiplier factor $\beta$ shown in FIG. 2. As shown the factor $\beta$ is kept in "0" till the timing signal is detected and the load signal is set to logical level of "1". At an instant that the timing signal is detected, the factor $\beta$ rises to "1" and then gradually decreases from "1" to "0".

The image signals outputted from the first and the second multipliers 19 and 21 are added together by the adder 22. The output signals of the adder 22 are applied to the D/A converter 23, where they are converted into an analog image signal. The image signals are then externally outputted through the output terminal 24.

Figure 3:
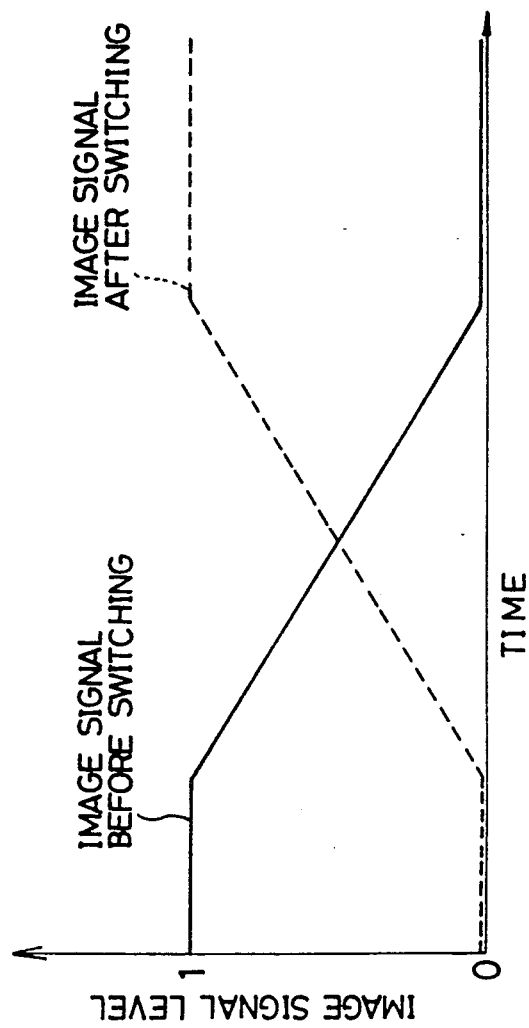
FIG. 3 shows a graphical representation of level variations of image signals in the video tape recorder of FIG. 1.

As seen from the foregoing description, in the image processing apparatus of this embodiment, as shown in FIG. 3 the image signals before switching gradually decreases in level, while the image signals, after switching gradually increases in level.

Figure 4:
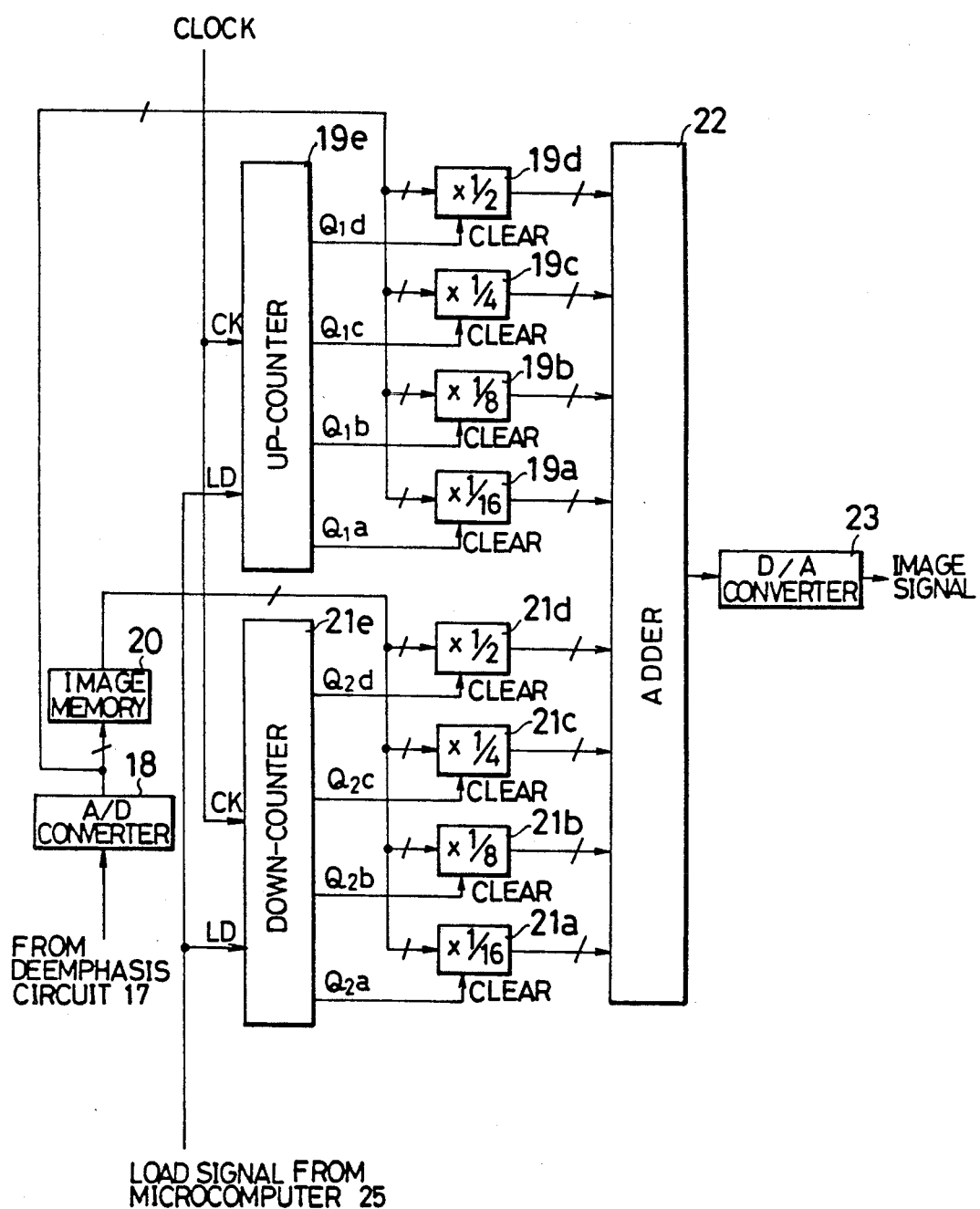
FIG. 4 is a block diagram showing the details of first and second multipliers in the video tape recorder of FIG. 1.

Hereinafter, the arrangements and operations of the first and the second multipliers are described in more detail. FIG. 4 illustrates the detail.

Figure 5:
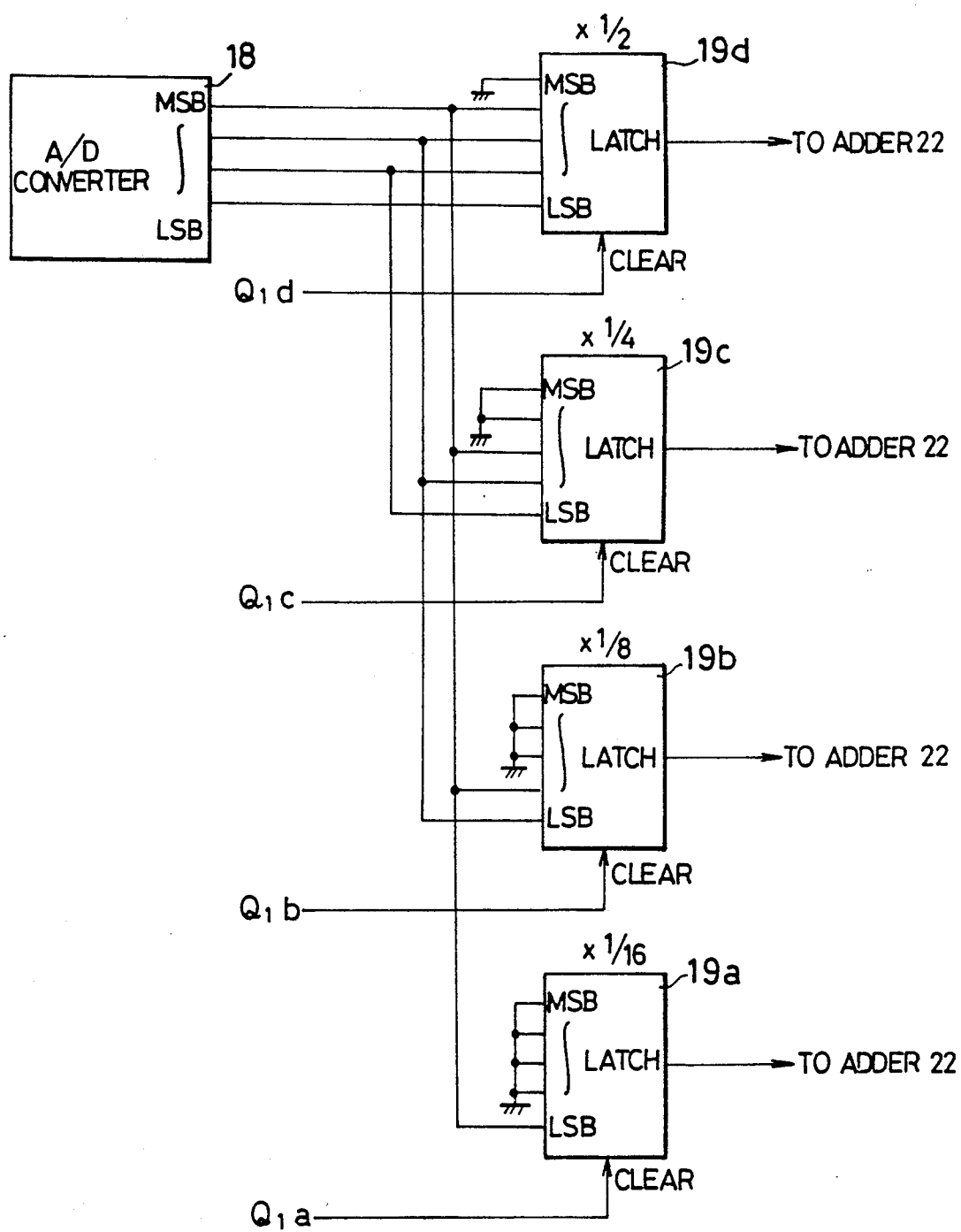
FIG. 5 is a block diagram showing the details of a part of the multiplier arrangement of FIG. 4.

In the FIG. 4, reference numerals 19a, 19b, 19c and 19d indicate latches coupled with the output of the A/D converter 18. Reference numeral 19e represents an up-counter. The combination of the latches 19a to 19d and the up-counter 19e form the first multiplier 19 (FIG. 1). The bit outputs Q1a, Q1b, Q1c and Q1d of the up-counter 19e are coupled with the latches 19a to 19d, respectively. The outputs of the latches 19a to 19d are coupled to the input of the adder 22 in parallel. When a signal of logical level of "1" is applied to the clear inputs CLEAR, the latches 19a to 19d output the stored contents. When a signal of logical level of "0" is applied, the latches output signals of logical level of "0". The latch 19a stores data 1/16 times the input data, the latch 19b stores, data ⅛ times the input data, the latch 19c stores, data ¼ times the input data, and the latch 19d stores, data ½ times the input data. Such multiples of the latches can be realized if the bit outputs of the A/D converter 18 and the bit inputs of the latches are wired as shown in FIG. 5.

In FIG. 4, reference numerals 21a to 21d represent latches connected to the output of the image memory 20, and numeral 21e represents a down-counter. The combination of the latches 21a to 21d, and the down-counter 21e form the second multiplier 21 (FIG. 1). The bit outputs Q2a to Q2d of the down-counter 21e are coupled with the latches 21a to 21d, respectively. The outputs of the latches 21a to 21d are coupled to the input of the adder 22 in parallel. The remaining arrangements and functions of the latches 21a to 21d are the same as those of the latches 19a to 19d.

Figure 6:
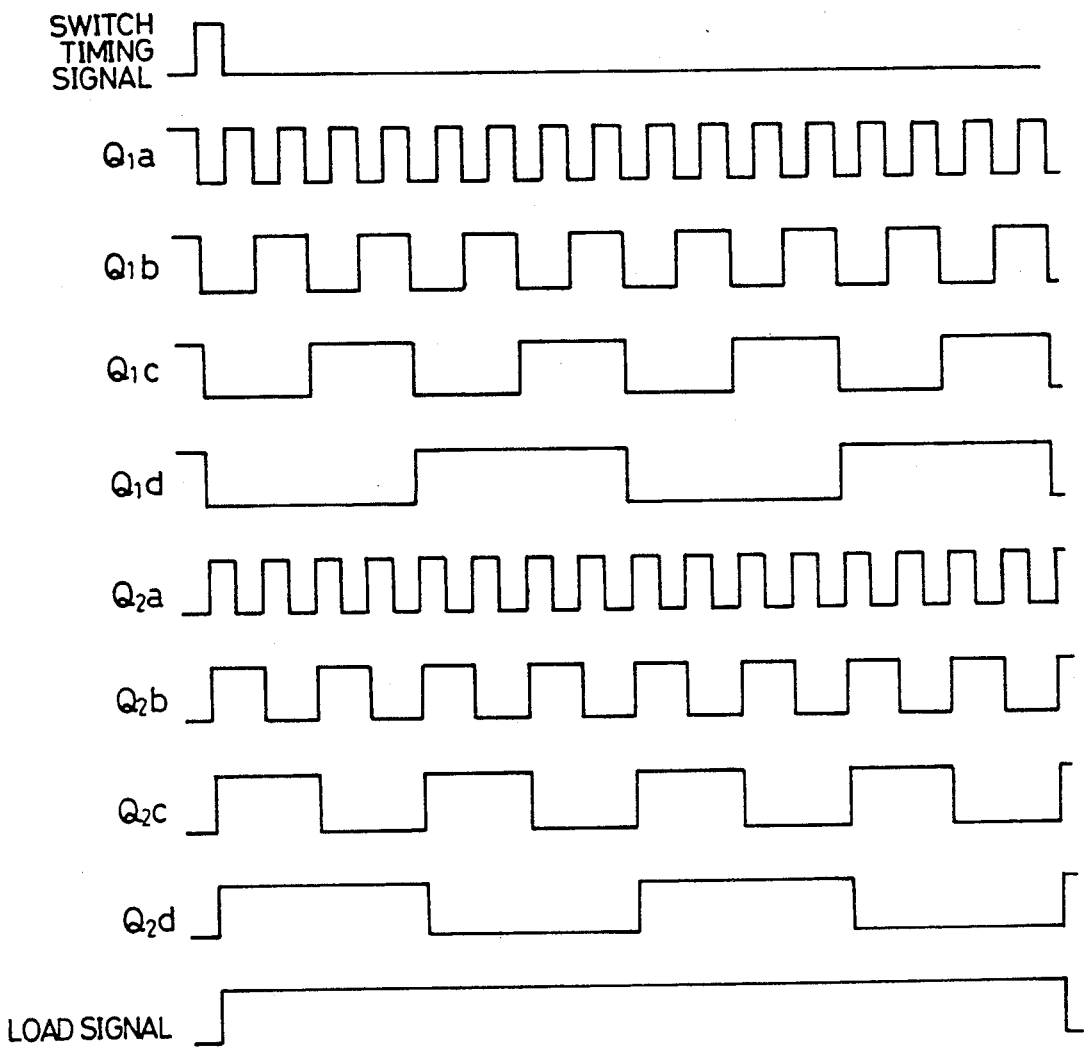
FIG. 6 shows a set of waveforms of signals in the multiplier arrangement of FIG. 4.

As shown in FIG. 6, under control of the microcomputer 25, the load signal rises to logical level of "1" at the leading edge of the timing signal derived from the detector 27. A logical level of "1" of the load signal is maintained until a predetermined number of clocks are counted. When the counted value exceeds the predetermined number, the load signal falls to a logical level of "0". As shown in FIG. 6, the predetermined number is 16 in this example.

When the load signal from the microcomputer 25 is at logical level of "1", the up-counter 19e and the down-counter 21e count clocks. With progression of the counting, the signals at the bit outputs Q1a to Q1d of the up-counter 19e, and Q2a to Q2d of the down-counter 21e vary as shown in FIG. 6.

Those counters 19e and 21e are initialized in case the load signal becomes to logical level of "1". As seen from FIG. 6, during the initial state, the bit outputs Q1a to Q1d of the up-counter 19e are all "1" and the bit outputs Q2a to Q2d of the down-counter 21e are all "0".

When the load signal is "0", all of the bit outputs of the up-counter 19e are "1" causing that the latches 19a to 19d continuously output their contents. On the other hand, all of the bit outputs 21a to 21d of the down-counter 21e are "0". Accordingly, the image signals from the A/D converter 18 are multiplied by a multiplier factor kept at a constant value, converted into analog image signal, and outputted to exterior.

When the load signal becomes "1", the up-counter 19e counts up the clocks and generates bit output signals Q1a to Q1d as shown in FIG. 6. With those output signals, the latches 19a to 19d are driven so that the factor $\alpha$ is gradually and stepwise increased from "0" to "1". The image signals from the A/D converter 18 are multiplied by this factor, and applied to the adder 22. On the other hand, the down-counter 21e counts down the clocks to generate bit output signals Q2a to Q2d as shown in FIG. 6. With those output signals, the latches 21a to 21d are driven so that the factor $\beta$ is gradually and stepwise decreased from "1" to "0". The image signals from the image memory 20 are multiplied by the factor, and applied to the adder 22. Through the operations, the factors $\alpha$ and $\beta$ of the first and the second multipliers 19 and 21 vary, as shown in FIG. 2. As a result, as shown in FIG. 3, the image signals before switching are gradually decreased in level, while the image signals after switching are gradually increased. Accordingly, the image processing apparatus thus arranged and operated successfully eliminate the unpleasant display when one kind of image signals is switched to the other kind of image signals, in reproducing the different kinds of the image signals.

While the present invention has been described using the VTR, it may be applied to many other digital image processing apparatuses, such as DAT (digital audio tape recorder) and video disk recorder.

Figure 7:
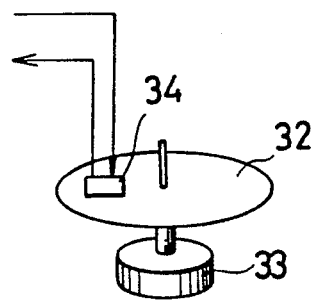
FIG. 7 shows a schematic diagram of a part of a video disk recorder in which the present invention is embodied in another mode.

In the case of the video disk recorder, a magnetic disk, an optical disk or an opto-magnetic disk is used as shown in FIG. 7. In FIG. 7, reference numeral 32 designates as disk, 33 a drive motor for driving the disk, and 34 a pick-up.

Many widely different embodiments of the present invention may be constructed without departing from the spirit and scope of the present invention. It should be understood that the present invention is not limited to the specific embodiments described in the specification, except as defined in the appended claims.

What is claimed is:

1. An apparatus for recording and reproducing image signals in a recording medium, comprising:
   means for recording image signals in the recording medium, including
   means for sequentially recording analog image signals of different images,
   key input means to be operated when the image signals of one image are switched to the image signals of a different image,
   timing signal generating means responsive to an operation of said key input means for generating a timing signal representative of a time at which the image signals of said one image are switched to the image signals of said different image, and
   means for recording said timing signal in the recording medium as the image signals are recorded; and
   means for reproducing image signals recorded in said recording medium, including;
   means for detecting the timing signal recorded in said recording medium during reproduction of the image signals,
   means for sequentially reading out analog image signals from said recording medium,
   means for converting analog image signals read out from said recording medium into digital image signals,
   means for storing in sequence single frames of the converted digital image signals until said detecting means detects the timing signal,
   means for reading out the converted digital image signals of the last frame stored in said storing means prior to the detection of the timing signals and for gradually decreasing the level of the read out image signals of said last frame from the time said detecting means detects the timing signals to produce decreased digital image signals of said last frame,
   means for gradually increasing the level of the converted digital image signals of following frames read out from said recording medium from the same time said detecting means detects the timing signals to produce increased digital image signals of said following frames,
   means for adding the level of the decreased digital image signals with the level of the increased digital image signals to produce digital output image signals, and
   means for converting the digital output signals into analog output image signals.

2. An apparatus as claimed in claim 1, wherein said recording medium is a magnetic tape.

3. An apparatus as claimed in claim 1, wherein said recording medium is a magnetic disk.

4. An apparatus as claimed in claim 1, wherein said recording medium is an optical disk.

5. An apparatus as claimed in claim 1, wherein said recording medium is an opto-magnetic disk.

6. An apparatus as claimed in claim 1, wherein said storing means includes means for holding one frame of the converted digital image signals for a predetermined period of time from the time said detecting means detects the timing signal.

7. An apparatus as claimed in claim 6, wherein said storing means includes an image memory capable of storing one frame of digital image signals.

8. An apparatus as claimed in claim 1, wherein said decreasing means includes means for multiplying the read out image signals of said last frame by a factor which is gradually decreased, to produce said decreased digital image signals.

9. An apparatus as claimed in claim 8, wherein said multiplying means includes a down-counter having a plurality of bit outputs, and a plurality of latches having respective clear inputs which are connected to said bit outputs of said down-counter, respectively.

10. An apparatus as claimed in claim 1, wherein said increasing means includes means for multiplying the converted digital image signals of said next frame by a factor which is gradually increased, to produce said increased digital image signals.

11. An apparatus as claimed in claim 10, wherein said multiplying means includes an up-counter having a plurality of bit outputs, and a plurality of latches having respective clear inputs which are connected to said bit outputs of said up-counter, respectively.

* * * * *